United States Patent [19]
Flaugher et al.

[11] Patent Number: 5,743,931
[45] Date of Patent: Apr. 28, 1998

[54] GLASS SHEET CONVEYING AND BENDING APPARATUS

[75] Inventors: Jeffrey Ronald Flaugher, Carleton, Mich.; William J. Skilliter, Genoa; Vince Dew, Toledo, both of Ohio

[73] Assignee: Libbey-Owens-Ford Co., Toledo, Ohio

[21] Appl. No.: 514,741

[22] Filed: Aug. 14, 1995

[51] Int. Cl.$^6$ .................. C03B 23/00; C03B 29/00; C03B 23/02; C03B 25/00
[52] U.S. Cl. .................. 65/287; 65/273; 65/291; 65/106
[58] Field of Search .................. 65/106, 107, 93, 65/287, 273, 291

[56] References Cited

U.S. PATENT DOCUMENTS

| | | |
|---|---|---|
| 3,338,695 | 8/1967 | Ritter, Jr. . |
| 3,701,644 | 10/1972 | Frank . |
| 3,856,499 | 12/1974 | Frank . |
| 3,869,269 | 3/1975 | Knapp . |
| 3,871,855 | 3/1975 | Frank . |
| 3,891,420 | 6/1975 | Frank . |
| 3,905,794 | 9/1975 | Revells et al. . |
| 3,929,441 | 12/1975 | Frank . |
| 3,934,996 | 1/1976 | Frank . |
| 3,992,181 | 11/1976 | Frank . |
| 4,043,783 | 8/1977 | Frank . |
| 4,047,919 | 9/1977 | Oelke et al. . |
| 4,218,232 | 8/1980 | Wilhelm . |
| 4,670,036 | 6/1987 | Enk et al. . |
| 4,872,898 | 10/1989 | Enk et al. . |
| 5,004,492 | 4/1991 | Borer et al. . |
| 5,286,271 | 2/1994 | Rueter et al. . |
| 5,292,356 | 3/1994 | Herrington et al. . |
| 5,297,669 | 3/1994 | Neuendorf . |
| 5,320,661 | 6/1994 | Fecik et al. ............... 65/104 |
| 5,578,104 | 11/1996 | Woodward et al. .......... 65/106 |

Primary Examiner—Donald E. Czaja
Assistant Examiner—Jacqueline A. Ruller
Attorney, Agent, or Firm—Marshall & Melhorn

[57] ABSTRACT

A press bending apparatus for shaping heat soften glass sheets between an upper press member and a lower press member is provided. The conveyor system for transferring the sheets of glass in the press bending apparatus includes concave shaped rollers such that the glass sheets tend to sag into conformity with the rolls as the sheets are positioned for bending operations between the upper and lower press members. The lower press member is a continuous press bending ring to prevent improper sagging of the glass sheet around the peripheral edges of the sheet. The concave shape of the rolls mounted inside of the press ring provides maximum support for the formed glass sheet to prevent sagging of the glass. Additional production benefits can be obtained by forming the conveyor system and lower press member as modular unit and the upper press member as a modular unit for each model of bent glass to facilitate changing the press members for production model changes.

17 Claims, 5 Drawing Sheets

GLASS SHEET CONVEYING AND BENDING APPARATUS

BACKGROUND OF THE INVENTION

1. Field of the Invention

The present invention pertains generally to an apparatus for the press bending of glass sheets, and more particularly, to a press bending apparatus provided with interchangeable subassemblies formed by a lower press member with interlocking conveyor. Arcuately shaped conveyor rolls are mounted within a continuous peripheral press bending ring such that the outer ends of the conveyor rolls are in close proximity to the press bending ring to support the heat-softened glass sheets.

2. Summary of Related Art

Glass sheet conveyor and bending apparatus are used in the mass production of curved or bend glass sheets for the automobile industry and other similar applications. In high volume production operations, sheets are generally advanced one after another along a horizontal path on roll-type conveyors through the production process. The specific operations in the production process include heating the glass to its softening point, bending the glass to the desired shape, and finally controlled cooling of the bent sheets of glass in order to anneal or temper the glass.

The glass sheets are heated to the softening point in passing through a heating furnace. The sheets are advanced by conveyor into a forming or bending area where the sheets are precisely shaped into the desired configuration. After shaping, the glass sheet is transferred to a cooling station where it is controllably cooled to temper or anneal the glass.

The primary processes used for shaping the heat-softened glass are roll forming, press bending, and gravity forming. In roll forming, the heated glass is conveyed on top of a series of shaping rolls, or between an upper set and lower set of shaping rolls which engage the glass for shaping. Press bending involves positioning the glass in the bending apparatus between complementary upper and lower shaping members. The properly oriented sheet is then engaged along its lower marginal edge portions by the lower press member and lifted from the conveyor rolls to be pressed to the precise predetermined curvature between the complementary shaping surfaces of the press members. In gravity forming, the heated glass is allowed to sag into conformity with a frame or series of contoured shaping rolls by the force of gravity.

To be suitable for automotive applications, the flat glass sheets must be shaped to precisely defined curvatures dictated by the shape and outline of the window openings in the vehicle. Another important requirement is that the windows meet stringent optical requirements and that the windows are free of optical defects and reflective distortion that could interfere with the view through the glass in the viewing area.

During the past several years, the automotive companies have been specifying the use of thinner glass sheets for automobile side windows as a means for reducing the overall weight of the vehicle. The thinner glass poses problems in shaping and tempering the glass due to heat retention differences and to the inability to achieve and maintain the desired shape of the glass after heating.

As the thickness of the glass decreases, the rate of heat loss increases and the heat initially imparted so the thin glass sheets is quickly dissipated upon leaving the heating atmosphere of the furnace and during the relatively cool shaping step. If the glass cools too quickly, the glass will not be sufficiently soft for expedient and proper bending, and the glass sheets will not retain the necessary heat for tempering. If the glass sheets are overheated to maintain the desired temperature, the glass sheets will be extremely pliable with attendant loss of deformation control and will tend to sag out of the desired shape beyond the close tolerances prescribed. Overheating tends to degrade the surface quality of the finished glass as a result of heat stains, roll distortion, roll marking, pitting, marginal edge sagging, and other related problems. In addition, automotive applications now require the bending of small, narrow rectangular and non-rectangular shaped glass.

In bending the glass sheets, a simple bend provides for the glass sheet to be bent along a single axis, which is generally transverse to the conveyor line. When a glass sheet is bent to a compound shape, the press forming apparatus must provide both a longitudinal and transverse axis of bending.

The glass industry needs improved glass bending apparatus which can process the thin glass in an efficient manner while minimizing degradation of the glass. One of the problems in bending glass is positioning and bending of the glass in the bending apparatus without distortion or sagging of the glass. After the glass is bent to the desired configuration, the glass must also be adequately supported as it is moved to the cooling step (anneal or temper) in the process.

Numerous patents have been issued regarding the process and equipment for roll forming glass, including patents disclosing the use of aligned pressure rolls in which a concave-shaped roll is paired with a convex-shaped roll. U.S. Pat. Nos. 3,701,644; 3,856,499; 3,871,855; 3,891,420; 3,929,441; 3,934,996; 3,992,181; 4,043,783 (Frank); and U.S. Pat. No. 3,869,269 (Knapp) disclose roll forming apparatus capable of shaping a succession of discrete moving glass sheets to either simple or compound shapes involving uniform and non-uniform radii of curvature.

U.S. Pat. No. 4,123,246 to Johnson et al. teaches shaping glass sheets by gradually transferring a succession of glass sheets from an obliquely disposed series of stationary, cylindrically shaped conveyor rolls onto alternately disposed, shaped, rotating stationary forming rolls.

U.S. Pat. No. 4,218,232 to Wilhelm discloses the shaping of glass sheet by lifting the moving glass sheets onto a first series of rotating shaping rolls moving transversely upward between adjacent stationary cylindrical conveyor rolls to provide rolling engagement against the lower surface of the glass for sufficient time to shape the glass. In this process, the upper surfaces of the glass are not touched during the shaping of the glass.

The press bending apparatus disclosed in the prior art have disclosed several configurations of mold forming members and conveyor rolls to position, bend, and convey the sheets of glass upon transfer from the furnace to the press bending apparatus. U.S. Pat. No. 3,338,695 to Ritter discloses a continuous peripheral press bending ring with a series of support rolls disposed within the open ring outline of the lower mold. The open ring is disposed slightly below the outer periphery of the support rolls. The rolls support the heated sheet of glass in the horizontal plane before and after the glass is bent between the continuous ring of the lower mold and the upper mold. However, the rolls did not fully support the heated glass in the press bending apparatus.

To provide support for the glass sheets while the sheets are in the highly heated softened condition necessary for proper bending, U.S. Pat. No. 3,905,794 to Revells et al. suggests the use of conveyor rolls of generally arcuate form, rotatable about their own axis. Each of the conveyor rolls comprises a non-rotatable inner core member and an outer sleeve mounted for rotation about and relative to the inner core member. The conveyor rolls support the heated glass sheet throughout its length before and after the sheet is bent. The rolls are disengagable from the glass sheet at the appropriate time to preclude frictional movement between the glass sheet and the conveyor rolls. The female shaping ring is formed by a plurality of segments including end bars.

U.S. Pat. No. 4,047,919 discloses a press bending apparatus having a segmented lower shaping rail and with contoured rolls to convey the sheets of glass. In addition, the press bending apparatus discloses supplemental heating means in the press bending area. The conveyor rolls are concave in shape and complement the curvature of the heat softened bent glass sheets. The concave portion of each roll is designed to be shorter than the transverse dimension of the sheet of glass to avoid frictional engagement of the lateral side portions adjacent the wider leading edge.

U.S. Pat. No. 4,670,036 teaches a continuous shaping ring with a plurality of rollers mounted on a support base. The rollers are located on both the inside and outside of the shaping ring to support the glass sheet. The heated glass sheets are received from the oven on contoured rolls and the sheets sag into conformity with the contoured rolls as the sheets are advanced into position for press bending.

A mobile press bending apparatus is described in U.S. Pat. No. 4,872,898 to Enk et al. Rails are laid out transversely of the production line in the press bending area between the furnace and the cooling station for tempering. In order to minimize model changeover time, two or more press bending sections are used on the production line. When one press bending section is in use, a second press bending apparatus is set up off-line with the required conveyor rolls and bending members. When a model changeover is scheduled to take place, the first press section is removed from production and the second press section is positioned in line to minimize lost production time.

U.S. Pat. No. 5,004,492 to Borer et al. teaches a another form of a press bending section with a continuous peripheral shaping rail mounted for vertical reciprocating movement. In the press bending section, the conveyor rolls are modified to provide stub rolls on the outside of the shaping rail and independent auxiliary rolls mounted inside the shaping rail.

A different mold configuration is disclosed in U.S. Pat. No. 5,286,271 to Rueter et al. A continuous ring forms the lower section of the mold and lifts the glass from a conveyor to engage the upper vacuum mold. Once the glass sheet is formed, the continuous ring is lowered and the glass sheet is retained against the upper mold by a vacuum. The upper mold is moved by overhead rails to deposit the formed glass sheet on the adjacent conveyor for further processing.

U.S. Pat. No. 5,292,356 discloses an apparatus for press bending glass sheets to a relative deep curvature. The upper press mold member is mounted on a special structure to facilitate reciprocal movement of the press mold member. A subplate is adapted for carrying a variety of press members.

Another recent press bending apparatus having rollers for processing glass sheet with reverse bend curvatures is disclosed in U.S. Pat. No. 5,297,669 to Neuendorf. The rolls in the press bending apparatus have a U-shaped portion at each end of the rolls to provide for a continuous shaping rail. One of the problems with the rolls with U-shaped ends is providing adequate support to the heated glass sheet around the peripheral edges of the glass in order to prevent sagging of the glass.

None of the patents disclose a continuous peripheral press bending ring in combination with a plurality of concave rollers positioned inside the ring. Additional improvements to the tooling configuration and the construction of the press bending apparatus are desired to improve production efficiency and the quality of the glass produced in the press bending operations.

SUMMARY OF THE INVENTION

In accordance with the present invention, there is provided a press bending apparatus for shaping heat-softened glass sheets. The press bending apparatus is designed for use in a standard glass bending operation. Flat sheets of glass are heated and delivered by conveyor to a press bending apparatus.

The conveyor system in the press bending apparatus includes concave shaped rollers such that the glass sheets tend to sag into conformity with the rolls as the sheets are positioned for bending operations between the upper and lower press members. The lower press member is a continuous press bending ring to provide support to the glass sheet around the peripheral edges of the sheet, which limits problems with sagging.

The concave rollers are mounted on drive shafts and positioned inside of the press bending ring. As the glass sheets are entering or exiting the press bending position between the press members, the press bending ring is recessed below the outer periphery of the concave rolls. Once the glass sheet is properly positioned between the upper mold and the lower mold, the press bending ring of the lower mold is raised to lift the glass sheet off of the conveyor and into pressing engagement with the forming surface of the upper mold. Once the glass sheet is formed, the press bending ring is lowered to its recessed position to permit the formed piece of glass to exit the press bending apparatus and the next sheet of glass to enter the apparatus. The concave shape of the interior rolls provides maximum support for the formed glass sheet to prevent sagging until the glass is transferred to the cooling area for tempering or annealing the glass sheet.

Additional production efficiencies can be obtained setting up a double production line in a single press bending apparatus. Such a production set up is ideally suited for side lights such that the left and right side windows can be bent at the same time. In a double line, the molds and tooling are rotated ninety degrees from the customary position such that the sheets of glass are conveyed with a narrow leading edge. The double line side lights can be processed in the same ovens and cooling systems as is used for the larger front windshields and back lights, which are formed in a single line mold configuration.

By rotating the tooling ninety degrees and using concave internal rollers, problems with rocking of the glass are minimized. The glass sheet, with a longitudinal axis of bending, will move smoothly on the concave rolls, as opposed to a transverse axis of bending which results in the glass sheet "rocking" across the rolls. Another benefit from rotating the tooling is a reduction in the temperature required for bending of the glass. Once the bent glass leaves the bending apparatus and enters the cooling section, the blast head tubes can be positioned closer to the glass, which reduces the gas pressure required for cooling the glass.

The concave, hour glass configuration of the rolls inside the press bending ring provides support less than one inch from the peripheral edge of the piece. When cylindrical rollers are used, several inches around the edge of the formed glass are unsupported and may sag as the formed glass is being transported by the conveyor. Even when contoured rolls are used with "duck under" segments (U.S. Pat. No. 5,297,669), sagging is a problem because of the unsupported edges around the periphery of the formed glass. The concave rolls are mounted on drive shafts and are locked in place.

The lower mold in the press bending apparatus is mounted on a base to facilitate the installation and removal of the lower mold as a completed subassembly. The lower mold includes a lifting device to lift the mold from the frame of the press bending apparatus. When the lower mold is lifted from the frame, the lower mold interlocks with the conveyor of the press bending apparatus to simultaneously remove the lower mold member and the conveyor. Specific molds and conveyor rolls can be assembled as a subassembly unit one time for each model of bent glass, and then the completed subassembly units can be installed and removed from the frame of the press bending apparatus as needed for production operations.

An object of the present invention is to provide an improved roll conveyor system and press bending ring configuration to minimize sagging and degradation in the formed glass.

A further object of the present invention is to furnish a lifting means or other positioning means such that the press bending apparatus can be moved as a unit. Multiple units can be utilize such that the set up work, including the removal and installation of lower press member subassembly units in the press bending apparatus, can be accomplished off-line while production is proceeding by use of a second press bending apparatus.

Another object of the present invention is to provide a double production line such that two sheets of glass can be formed at one time. For the smaller side light sheets of glass, the press bending apparatus of the present invention can bend two pieces of glass at the same time. The double line is especially efficient for processing left and right pieces of glass for automotive side lights.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
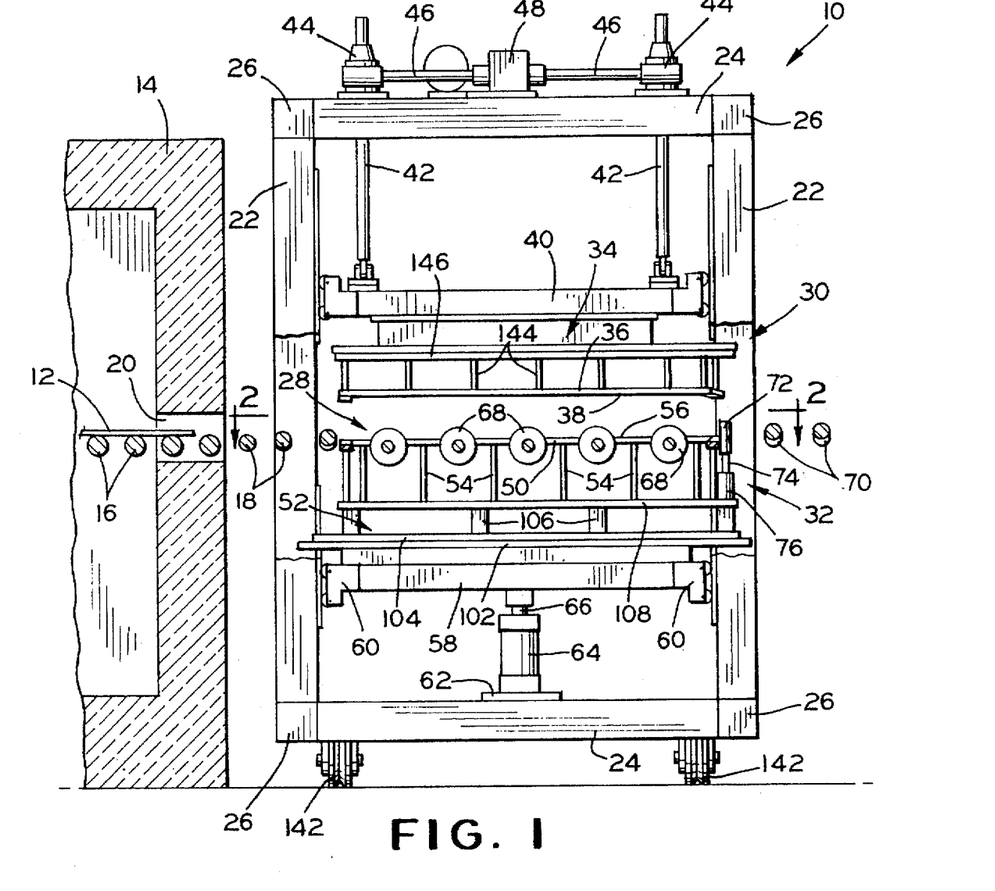
FIG. 1 is a side elevational view, with parts broken away, of a bending apparatus interposed between a glass heating furnace and a glass tempering station and embodying the sheet supporting and conveying apparatus of the invention.
Figure 2:
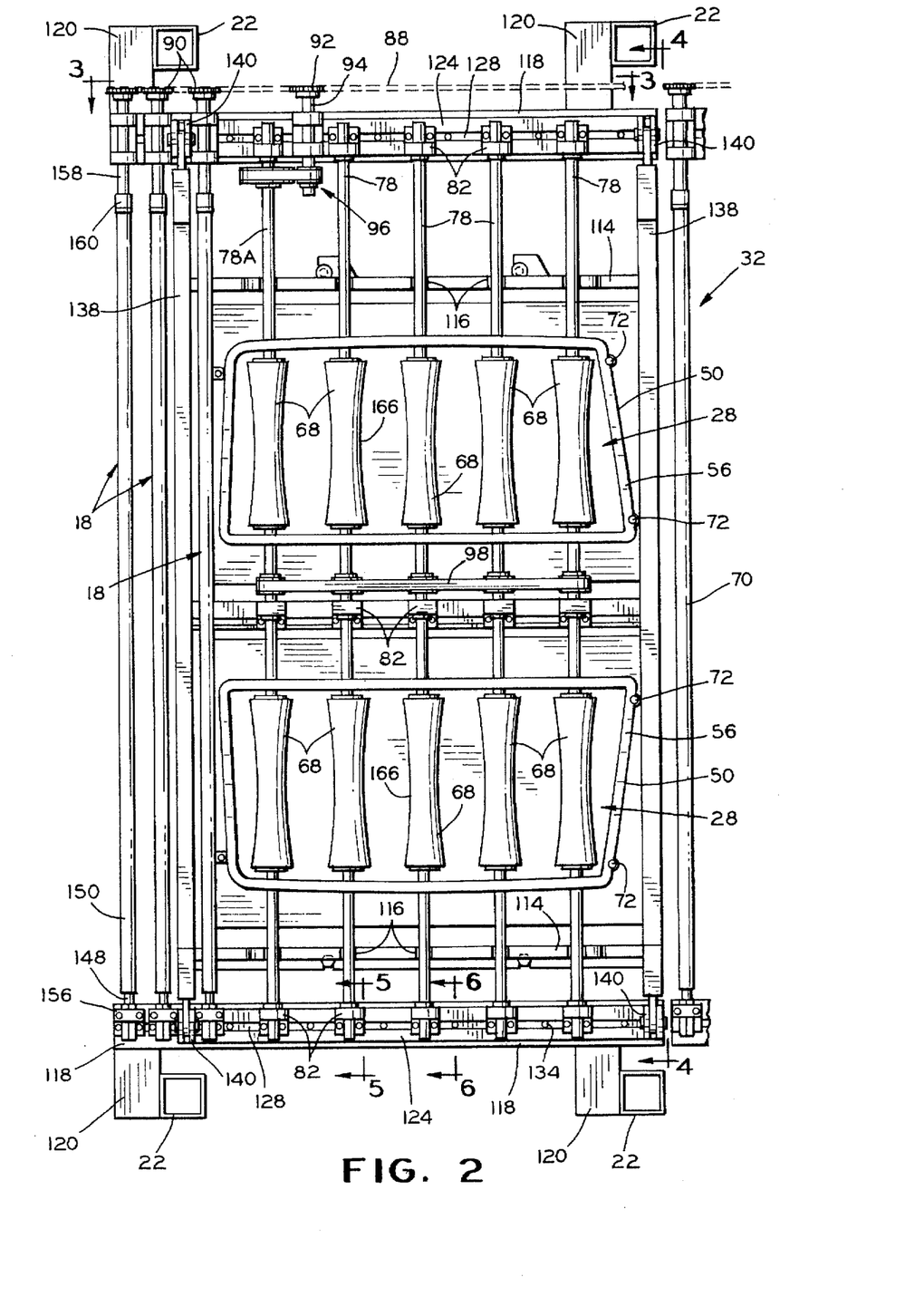
FIG. 2 is an enlarged top plan view taken substantially along line 2—2 of FIG. 1 illustrating the relationship between the conveyor rolls and the shaping rail of the lower press member.

Referring now to the drawings, there is shown in FIGS. 1-2 a press bending apparatus 10 for bending glass sheets for automotive applications. The process equipment for bending sheets of glass 12 includes a furnace 14 to heat the glass 12 to its softening point, the press bending apparatus 10, and a cooling section (not shown) for tempering or annealing the glass.

In the heating section with furnace 14, glass sheets 12 are conventionally heated in a controlled manner while carried sequentially through a furnace 14 on aligned conveyor rolls 16. The glass sheets 12, heated to their bending temperature, exit the furnace 14 through an opening 20 in the rear end wall of the furnace 14 and are transferred to the press bending section by preforming conveyor rolls 18.

The press bending apparatus 10 comprises a skeletal framework, generally in parallel-piped form, including upstanding corner posts 22 interconnected at their top and bottom by longitudinal beams 24 and transverse beams 26 to form a rigid box-like structure. The press bending apparatus 10 includes a conveyor system 28 which is aligned with the preforming conveyor rolls 18 such that the glass sheets 12 received from the preforming conveyor rolls 18 are conveyed and positioned for bending. The press conveyor system 28, as will be hereinafter more fully described, is intended to support and convey the glass sheet 12 after bending while it is at a temperature susceptible to deformation and sagging under adverse conditions.

Mounted within the framework of the press bending apparatus 10 for reciprocating relative movement toward and away from each other are the upper male press member 30 and the lower female press member 32. The upper and lower press members 30, 32 are provided with opposed complementary shaping surfaces conforming to the curvature to which the flat glass sheets 12 are to be bent.

The upper press member 30 includes a base structure 34 for supporting a mold element 36 having a downwardly directed, generally convex shaping surface 38 to impart the desired curvature to the sheet 12. The specific outline and curvature of the shaping surface 38 will be dictated by the particular curvature and configuration to be imparted to the glass sheet 12. It is contemplated that the upper mold element 36 may comprise either a continuous shaping surface or a peripheral shaping rail of outline or ring type construction.

The base structure 34 carrying the upper mold element 36 is affixed to an upper platen 40 which is suspended from the horizontal beam 24 as by shafts 42 extending from screw jacks 44. The screw jacks 44 are connected by drive shafts 46 to a drive unit 48. By operating the drive unit 48, the screw jacks 44 are driven in unison to raise or lower the upper platen 40 and the upper press member 30 carried thereby to selected operating positions. The upper press member 30 may be positioned at the start of a production run and be maintained in the fixed position, or alternatively, the upper press member 30 may be raised and lowered between a rest elevation and a press bending elevation in the bending cycle.

The lower press member 32 includes an outline or ring type shaping member 50 affixed to a multilayered base 52 in spaced relation thereto by a plurality of adjustable mounting posts 54. The length of the posts 54 can be adjusted to achieve the desired positioning of the shaping ring 50. The shaping ring 50 conforms in outline to the glass sheets 12 to be bent, and is provided on its upper face with a generally concave shaping surface 56 complementary to the upper member shaping surface 38. The shaping ring 50 and its relationship to the bending conveyor system 28 and the base 52 configuration will be hereinafter more fully described.

The base 52 is carried upon a lower platen 58 mounted for vertical reciprocating movement. Guide means 60 are provided at the corners for confining the lower platen 58 to a precise vertical path defined by the corner posts 22. The lower platen 58 is constructed for vertical movement by a fluid actuator 64 mounted on a mounting frame 62 which is supported by additional longitudinal beams 24 or transverse beams 26 mounted in the middle of the structure. A piston rod 66 of the fluid actuator 64 is affixed to the platform 58 in order to raise and lower the platform 58. The piston rod 66 raises the lower press member 32 and the shaping ring 50 carried thereby, between its lowered position beneath the rolls 68 of the conveyor 28 and its raised position thereabove for lifting a heated sheet of glass 12 from the rolls 68 and pressing the glass 12 against the upper press member 30 and between the complementary shaping surfaces 38, 56 to form the sheet of glass to the desired curvature. Following bending, the piston rod 66 is retracted to lower the shaping ring 50 below the conveyor rolls 68 and deposits the bent sheet of glass thereon for advancement into the adjacent cooling section on conveyor rolls 70.

Laterally spaced locator stops 72 are appropriately positioned in the path of the advancing glass sheet 12 to stop and precisely position the glass sheet 12 in the desired location relative to the press members 30, 32. Each stop 72 is affixed to a piston rod 74 of a fluid actuator 76. The actuators 76 are operable to raise and lower the stops 72 in timed sequence between an upper position above the bending conveyor system 28 and in the path of movement of the sheets 12 on rolls 68, and a lower position therebeneath.

The rate of movement of the glass sheets 12 during each phase of the operation is controlled by a motor control system (not shown) to be commensurate with the operation being performed on the glass sheet 12. The variable speed motors used to control the conveyor speed in each of the three phases are all connected to the motor control center such that any adjustments made to vary the speed of the motors (i.e., the furnace conveyor is slowed to increase the temperature of the glass) will effect corresponding adjustments in the rates of speeds of the other conveyor sections to maintain the respective rates of speed proportional.

Figure 3:
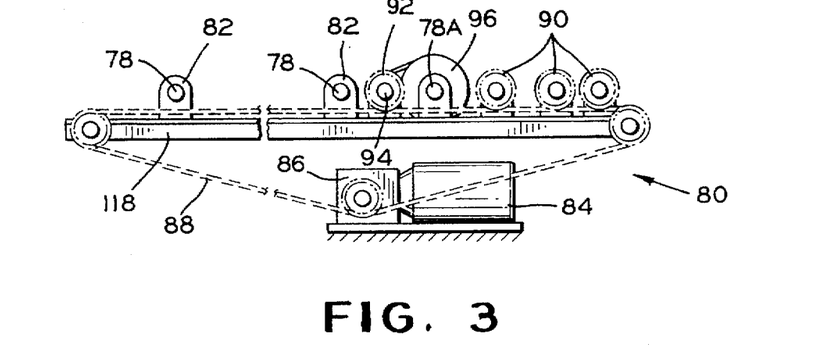
FIG. 3 is an enlarged fragmentary view, partly in section, taken substantially along line 3—3 of FIG. 2, illustrating the drive for the conveyor rolls.

For the conveyor system 28 in press bending apparatus 10, the conveyor drive 80 shown in FIG. 3 is used to drive the drive shafts 78 on which the rolls 68 are mounted. The drive shafts 78 are supported by shaft bearings 82 at each end and in the middle of the shaft 78. A variable speed motor 84, gear reduction mechanism 86, and endless chain drive 88 are used to drive pinions 90 connected to three preforming conveyor rolls 18 and a drive pinion 92 connected to a short shaft 94 to drive an input gear on timing belt mechanism 96. The output of the first timing belt mechanism 96 is used to drive one of the conveyor drive shafts 78A. A second timing belt mechanism 98 is then used to rotatably drive the balance of the shafts 78 in the press bending apparatus 10.

Figure 4:
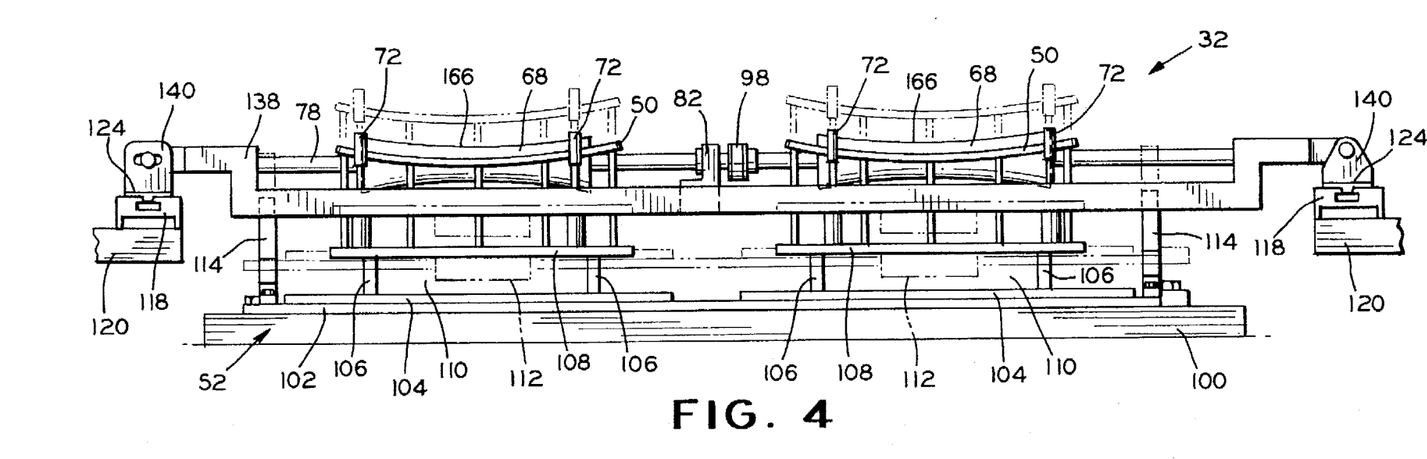
FIG. 4 is an elevational view, partly in section, taken along line 4—4 of FIG. 2 and illustrating in broken lines the lower press member raised for transport.
Figure 7:
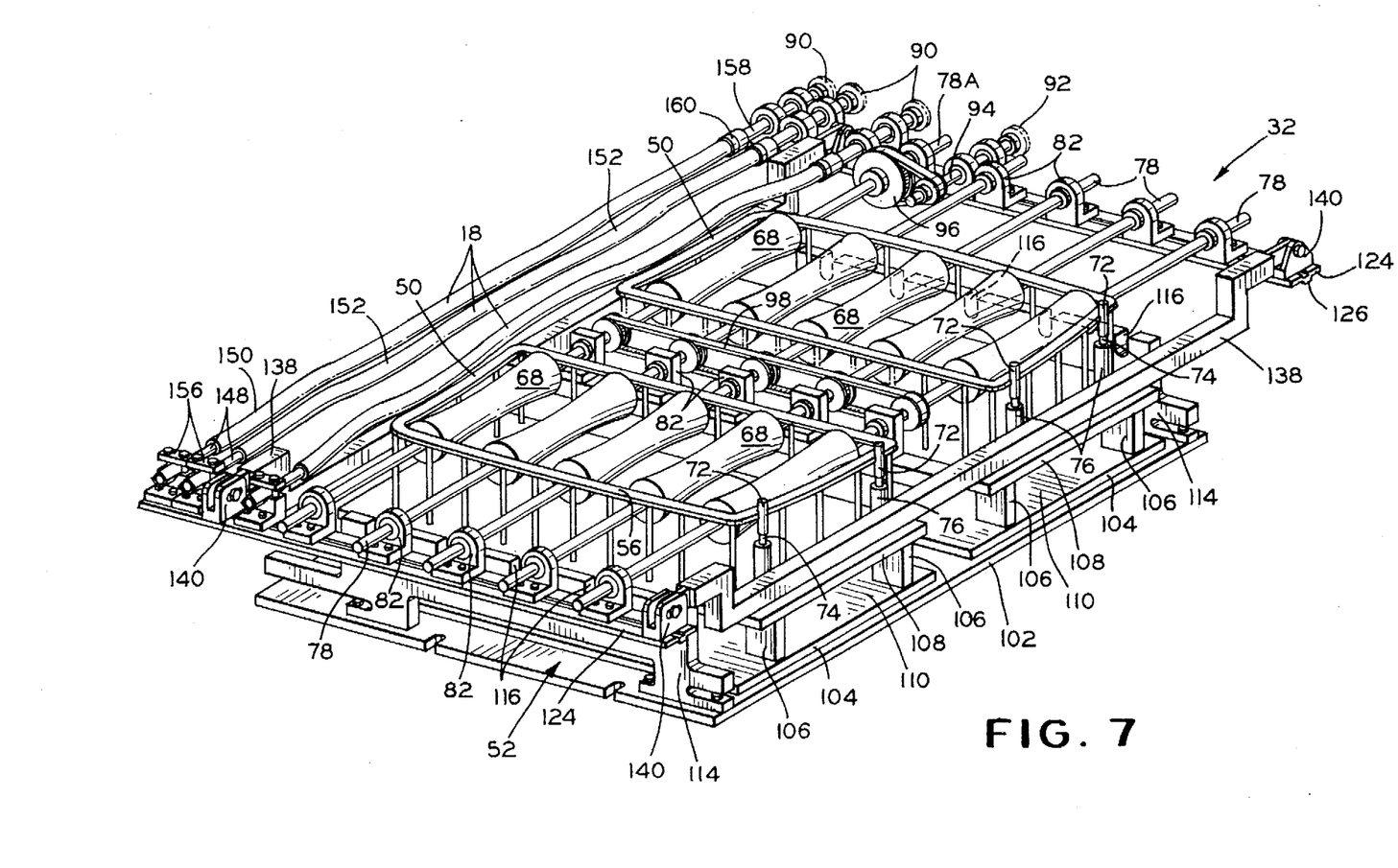
FIG. 7 is a perspective view of the lower press member of the press bending apparatus in an operating position with the corner posts, roll beams, and lower member platen omitted.

The lower press member 32 which is mounted on lower platen 58 is shown in more detail in FIGS. 4 and 7. The platen table 100 provides a standard means of connection to the lower platen 58. An adapter plate 102 is then bolted to the platen table 100. A base plate 104 for each line is then affixed to the adapter plate 102. A plurality of vertical spacers 106 are used to support a sub-plate 108 on the base plate 104, which creates a lifting means defined by a pair of apertures 110 between the base plate 104 and the sub plate 108. The posts 54 and actuator 76 are mounted on the sub plate 108.

The apertures 110 are sized for receiving and lifting by the tines 112 (shown in phantom in FIG. 4) of a fork lift, which may be used to lift the lower press member 32 (when disconnected from platen 58) to facilitate installation and removal of the lower press member 32 from the press bending apparatus 10. In addition, the lower press member 32 includes a pair of end walls 114 mounted on the adapter plate 102. Rounded grooves or slots 114 are formed in the upper edge of the end walls to receive and support the conveyor drive shafts 78 during the concurrent installation and removal of the lower press member 32 and bending conveyor system 28.

The bending conveyor system 28 is independently mounted to the corner posts 22 of the press bending apparatus. The press bending rolls 68 and the lower press member 32 are typically designed for and used exclusively with a specific model of bent glass. Consequently, the bending conveyor system 28 with rolls 68 and the lower press member 32, although mounted independently in the press bending apparatus 10, are concurrently installed and removed from the press bending apparatus 10, and are stored as a unit for subsequent production use.

The bending conveyor system 28 is mounted on roll beams 118 which are secured to the corner posts 22 by support arms 120 (FIGS. 2 and 4–7). Two support arms 120 are welded to the corner posts 22 on each side of the press bending apparatus 10. The support arms 120 extend perpendicular to the corner posts 22 and are generally rectangular in shape. The two roll beams 118 are then welded or bolted to the upper surface of the support arms 120 in parallel relationship. The roll beams 118 remain in a fixed position on the press bending apparatus 10. The roll beams 118 include a longitudinal, inverted T-slot 122 extending the full length of the roll beams 118.

Figure 5:
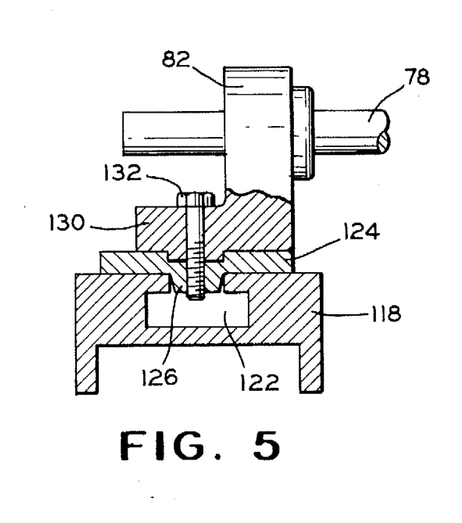
FIG. 5 is an enlarged sectional view taken substantially along line 5—5 of FIG. 2 showing the roll beams and the mounting of the conveyor roll drive shafts on the mounting track.
Figure 6:
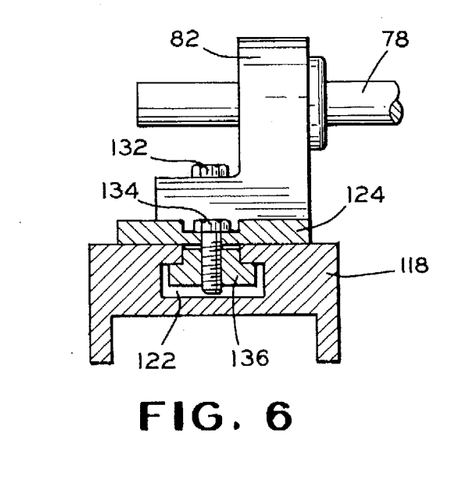
FIG. 6 is an enlarged sectional view taken substantially along line 6—6 of FIG. 2 showing a T-nut for securing the mounting track to the roll beam.

The shaft bearings 82 which support the conveyor drive shafts 78 are secured to mounting rails or tracks 124 which are mounted on the roll beams 118. The mounting rails 124 include a boss 126 on its bottom surface for aligning the rail 124 in the inverted T-slot 122. The top surface includes a channel 128 for receiving a corresponding lug on the mounting base 130 of the bearing 82. The bearing 82 is secured to the rail 124 by bolts 132. The two mounting rails 124 are secured to the two roll beams 118 by mounting bolts 134 and T-nut 136.

Two cross bars 138 are connected to brackets 140 mounted on the mounting rails 124. The cross bars 138 provide additional rigidity and ensure alignment when securing the mounting rail 124 to the roll beams 118. When the mounting rails 124 are disconnected from the roll beams 118, and the lower press member 32 and conveyor 28 are being installed or removed from the apparatus 10, the shafts 78 are secured in slots 116 of end walls 114. The bearings 82 are in proximity to the outer surface of the end walls 114 such that the conveyor 28 cannot shift in any direction and is retained in the lower press member 32 for storage purposes.

As shown in FIG. 4, the tines 112 of a fork lift will initially engage the subplate 108 for lifting the lower press member 32. After a short vertical lift, the tines 112 will also engage the cross bars 138 to simultaneously lift the lower press member 32 and the conveyor 28, which are interlocked to form a single subassembly as described above.

The press bending apparatus 10 is mounted upon adjustable wheels 142 (FIG. 1) such that the entire press bending apparatus 10 can be removed from the production line and replaced by a like apparatus having the appropriate press bending conveyor 28, upper press member 30, and lower press member 32 for bending sheets of glass 12. In changing the entire press bending apparatus, it is only necessary to disconnect a minimum of drive and control members, substitute one press bending apparatus 10 for another, reconnect the drive and control members, and align and level the press bending apparatus relative to the furnace and cooling unit of the production line. A substantial amount of production time can typically be saved by installing and testing conveyor rolls and shaping members away from the production line.

The press bending apparatus 10 may include adjustable wheels and leveling supports for alignment and leveling purposes. The apparatus for centering and leveling disclosed in U.S. Pat. No. 4,872,898 are incorporated herein by reference.

In the production facility, rails extending transversely of the production line are used to roll a first press bending apparatus away from the production line, and roll a second press bending apparatus set up for producing the desired piece of bent glass back into position in the production line. Once the press bending apparatus is rolled away from the production line, the apertures 110 in the lower press member 32 are now accessible such that a fork lift can be used to lift lower press member 32 and conveyor 28 from the apparatus 10 and to install a different subassemblies into the apparatus 10.

The assembly, alignment, and testing of the press bending conveyor 28, the upper press member 30, and the lower press member 32 requires considerable time and effort. Once acceptable production is achieved, such subassemblies are typically maintained and stored as completed subassemblies. In production operations where only a limited number of bent glass production models are produced, a separate press bending apparatus 10 could be maintained for each model.

In production operations where a large number of bent glass models are produced, it is generally preferred to maintain only subassemblies (upper press member 30 and conveyor-lower press assembly 28,32) for each model. The sub assemblies can be stored in racks and then installed in the frame structure of the press bending apparatus 10 when needed for production operations. Consequently, only two or three frame structures and (corner posts 22, beams 24, 26, roll beams 118) with upper platen 40, lower platen 58 and related positioning drive equipment, are generally required in a manufacturing facility. While one press bending apparatus 10 is in use in the production line, the upper press member 30 and the press conveyor-lower press member 28,32 for the next scheduled production model can be installed in the second press bending apparatus 10 for insertion into the production line.

In changing the upper press member 30, the base structure 34 is unbolted from the upper platen 40. The base structure 34 includes a base plate 146 with adjusting posts 144 to adjust the configuration of the upper mold element 36. The base plate 146 is the structural member to be used for lifting and moving the upper press member 30. A fork lift or other lifting means can be used in removing an upper press member 30 from the press bending apparatus 10 and inserting a different upper press member.

The lower press member 32 and press conveyor 28 are installed and removed from the press bending apparatus 10 as a unit. The lower press member 32 is attached to the lower platen 58 and the press conveyor 28, including rolls 68 and shafts 78, are attached to the roll beams 118 as described above. FIG. 7 shows the lower press member 32 and press conveyor 28 in an operating position as if such subassemblies were fully attached and in production operation. Once the apparatus 10 has been removed from the production line, and the lower press member 32 is disconnected from the platen 58 and the mounting rails 124 of the conveyor 28 is disconnected from the roll beams 118, the lower press member is lifted by fork lift tines in aperture 110 until the mounting rails 124 are lifted from the roll beams 118 and shafts 78 are supported in slots 116 of end walls 114 (FIG. 4) as described above. The lower press member 32 and conveyor 28 are removed and stored as a subassembly unit, and the appropriate subassembly unit is installed in the press bending apparatus 10 for the next rotation of the subassembly units 10 in the production line. Once the upper press member and the lower press member 32 with conveyor 28 have been assembled, tested, and approved for production use, it is relatively easy to maintain such quality levels on subsequent production use.

With the just in time delivery system implemented by the automobile manufacturers and with cost pressures to minimize production down time and inventory levels, it is essential that producers of automobile glass have an efficient, reliable, high quality and cost effective means of changing production models. The use of two or more press bending apparatus 10 with interchangeable press member 30, 32 and conveyor 28 subassemblies provides such capabilities.

One of the key factors in achieving the desired quality with the press bending apparatus 10 is the configuration and relationship between the lower ring member 50 of the lower press member 32 and the rolls 68 in conveyor 28. Overcoming problems in sagging and other degradation of the glass sheet 12 has become more challenging with the decrease in the thickness of the automotive glass for side lights from 0.25 in. to 0.118 in. (3 mm) or less.

In early press bending apparatus, the press bending conveyor rolls for supporting and conveying the glass sheets in conjunction with the lower press member were straight rolls of uniform diameter extending transversely of the path of travel of the sheets. A series of rolls were disposed within the confines of a continuous open ring of the lower press member and mounted on shafts extending transversely of the path of the glass. After the glass sheets were bent, the rolls provided no support to the outer perimeter of the bent sheets, which caused problems with sagging when using the thinner glass.

Subsequent developments included the use of flexible rolls which tend to assume the curvature imparted to the bent sheets deposited thereon after press bending, and rolls having arcuately curved intermediate sections which are disposed in a common plane for supporting the sheets prior to bending and then pivoted downwardly to define a supporting surface complementary to the curvature imparted to the sheet for receiving the bent sheet from the lower press member. In these subsequent roll configurations, the lower press member, which is of ring type construction, utilizes a ring type shaping rail comprised at least in part of a plurality of segments arranged end-to-end in the desired outline pattern. The adjacent ends of the shaping rail segments are spaced apart sufficiently to permit passage of the shaping rail between adjacent rolls during raising and lowering of the lower press member in the press bending cycle.

With the advent of automotive styling of glass sheets having irregular outlines or complex configurations, an additional problems is encountered in that transversely extending rolls may intersect the shaping rail obliquely, or at an acute angle. As a result, the spaces or gaps required in the shaping rail for passage of conventional straight rolls increased to the point that the unsupported, heat-softened, thinner glass may sag into the gaps and acquire an unacceptable shape.

Because of the sagging problems in the glass caused by the segmented shaping rail, roll systems have been developed which employ a continuous outline shaping rail to provide uninterrupted support around the periphery of the glass sheet. In U.S. Pat. No. 5,004,492 separate individual rolls are provided for supporting and conveying glass sheets inside and outside the shaping rail. A special shaft configuration and drive means is provided beneath the shaping rail between the interior and exterior rolls.

Another roll configuration is disclosed in U.S. Pat. Nos. 5,292,356 and 5,297,669. The concave conveyor rolls are of progressively increasing curvature from the exit end of the furnace into the press bending area, which gradually preforms the glass sheet prior to bending the sheet between the upper and the lower press members. In addition, the press rolls include a U-shape portion at each end of the roll which passes beneath the shaping rail of the lower press member when the rail is in the lowered position. FIG. 3 of U.S. Pat. No. 5,292,356 shows such U-shaped portions of the roll (the "duck under" roll) and the potential sagging problems caused by the lack of support along the curved edges of the glass sheet.

In the present invention, the preforming conveyor rolls 18 are the contoured type comprising an inner, hollow, stationary core member 148 and an outer, flexible, load carrying sleeve rotatable 150 thereabout. Such contoured conveyor rolls are disclosed and described in U.S. Pat. No. 3, 05,794 which is incorporated herein by reference. As shown in FIG. 7, the preforming conveyor rolls 18 of the present invention include two contoured portions 152. Contoured portions of increasing curvature may be employed leading into the press bending apparatus 10 to preform the glass sheets 12. The post-forming contour rolls 70 are of similar construction and contoured for conveying the bent sheets from the press bending apparatus 10 into the adjacent processing station for cooling the bent glass 12.

The core member 148 is formed from stainless steel tubing or other similar material. At one end, the core member 148 of conveyor roll 18 extends beyond the rotatable sleeve 150 and is secure against rotation by suitable mounting means 156 on mounting rail 124 of the structural framework. The other end of core member 148 is secured on the opposing mounting rail 124 by a rotatable collar 158. The outer sleeve 150 is also attached to the rotatable collar 158 by coupling member 160. As noted above, the rotation of drive pinion 90 causes the outer sleeve 150 of conveyor roll 18 to rotate in a controlled manner.

The conveyor 28 of the press bending apparatus 10 includes parallel shafts 78 rotatably connected between the mounting rails 124. The series of rolls 68 which are mounted on the shafts 78 are disposed within the ring type shaping rail 50 of the lower press member 32. Each conveyor roll 68 is formed of a suitable material, such as aluminum. The roll 68 may be hollowed out to form an internal aperture 162 (FIG. 8), which reduces the weight of the roll 68 to be supported on shaft 78, and which also reduces the weight to be lifted when changing out the lower press member 32 and conveyor 28 combination.

Figure 8:
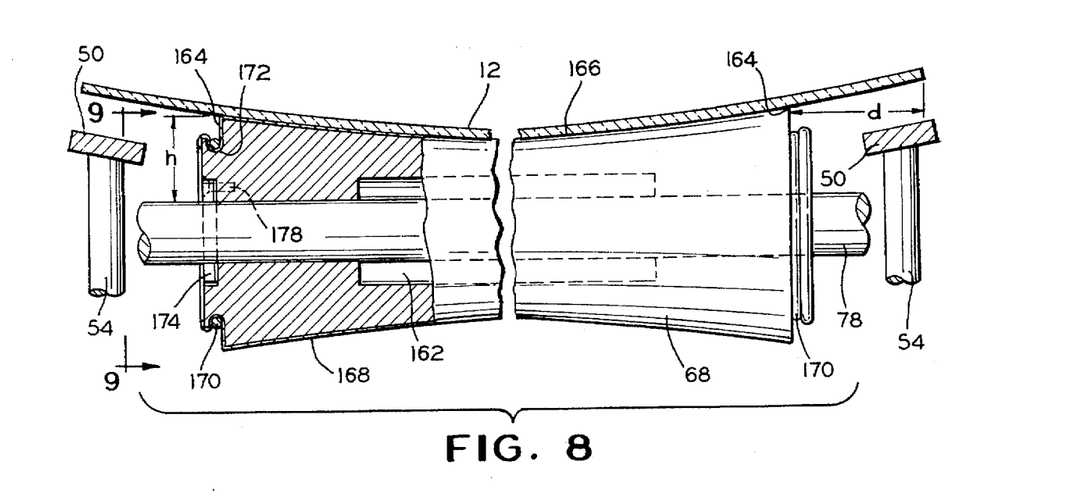
FIG. 8 is an enlarged elevational view, partly in section and with parts broken away, of the concave conveyor rolls within the shaping ring, showing details of the coupling for connecting the rolls to the drive shafts.

As shown in FIG. 8, each roll 68 has an hour-glass shape such that the ends portions 164 of the roll 68 have a height of h. The roll 68 has a progressively diminishing cross section from the end portions 164 inwardly to the center of the roll 68 to provide curved, generally concave supporting surface 166 in front elevation complementary to the curvature of the heat-softened bent glass sheets 12. The support surface provides excellent support for the bent sheets 12 to prevent sagging of the sheets out of their desired shape during conveyance out of the press bending apparatus 10.

The height h of the end portions 164 of rolls 68 must be greater than the thickness of the ring shaping rail 50. Such relationship allows the shaping rail 50 to be formed as a continuous ring and still have the shaping rail 50 be removable from the path of the glass sheet 12 as the glass sheet enters and exits the press bending apparatus 10. The sagging can be reduced or eliminated by minimizing the distance d shown in FIG. 8 between the outer edge of the glass sheet 12 and the outer edge of end portion 164. The shaping rail 50 is mounted as close as possible to the end portion 164 to minimize d.

The prior art press bending apparatus which utilize segmented ring shaping rails have gaps in the ring which results in sagging of the heat-softened glass in the gap areas. The prior art continuous ring press bending apparatus also have problems with sagging because the rolls are not capable of providing the desired support at the periphery of the glass sheet. For example, the duck under conveyor roll with continuous ring noted above will have a distance d of approximately 5 inches compared to a distance d of approximately 1 inch or less in the present invention. In addition, the hour-glass shape of the rolls 68 permits the support surface 166 to continuously support the glass sheet 12 as the rolls 68 are rotated.

The rolls 68, as shown in FIG. 8, are covered with a suitable material 168 to protect the surfaces of the bent glass sheets 12. The material 168 must be heat resistant, yet soft enough not to mark the surface of the bent glass sheets 12. A suitable material is sold under U.S. Trademark KEVLAR by E.I duPont de Nemours & Co. of Wilmington, Del.

The material 168 on rolls 68 is retained by a retention device at each end of the rolls 68. The retention device shown in FIG. 8 is an O-ring 170 positioned in a retention groove 172 at the end of the roll 68.

Figure 9:
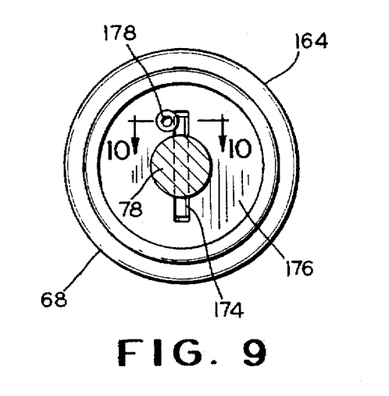
FIG. 9 is an elevational view of the roller, partially in section, taken along line 9—9 of FIG. 8.
Figure 10:
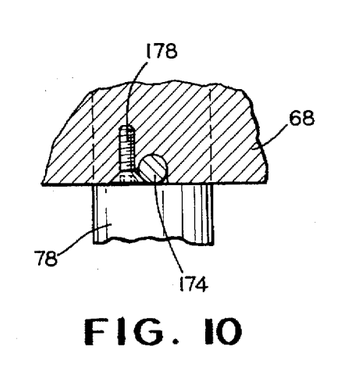
FIG. 10 is a sectional view of the coupling taken along line 10—10 of FIG. 9.

FIGS. 9–10 shows the apparatus used to secure the roll 68 to the shaft 78. A hole is drilled in the shaft 78 at the location for positioning one end of the roll 68. A retention key 174 is inserted in the shaft hole. The roll 68 includes an aperture in the end surface 176 for receiving the key 174 as the roll 68 is slid into position on the shaft 78. A bolt hole is drilled in the end surface 176 for insertion of a locking bolt 178 to retain and secure the roll 68 in the desired position on the shaft 78.

The press bending apparatus 10 shown in the drawings is a double line with two ring type shaping members 50 and two sets of conveyor rolls 68 mounted within the marginal outline of the ring members 50. Each shaft 78 includes two conveyor rolls 68, one for each of the ring members 50. The press bending apparatus can be set up as a single line for bending one sheet of glass at a time or as a double line for bending two sheets of glass being conveyed in parallel on the conveyor system 28. Minor changes to the control system would facilitate sensing both sheets of glass 12 during the process and controlling two position stops 72. The double line production capability in the press bending apparatus 10 adds significant production flexibility without a significant increase in the cost of the press bending apparatus 10.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. Apparatus for press bending heat-softened glass sheets comprising:

a frame;

a bending mold mounted on said frame for bending sheets of glass, said bending mold including opposed lower and upper horizontally disposed press members having complemental shaping surfaces, the lower press member having a continuous peripheral shaping rail conforming to a marginal outline of the sheet of glass;

drive means mounted on said frame for selectively raising and lowering the lower press member to position the shaping rail in a lowered position for receiving a first sheet of glass, in a raised position for shaping the first sheet of glass between the lower and upper press members, and in the lowered position for transferring the first sheet of glass after it is bent and then receiving a second sheet of glass;

a conveyor mounted on said frame for moving the sheets of glass along a predetermined path from a heating end of said frame through a bending area between the lower and upper press members to a cooling end of said frame, said conveyor including, in the bending area, a plurality of rotatably mounted, parallel, straight shafts extending transversely across the path below the shaping rail of the lower press member; and a plurality of conveyor rolls, each conveyor roll being longitudinally secured on one of the straight shafts such that the conveyor rolls are disposed within the marginal outline of said shaping rail, said conveyor rolls having opposing end portions extending radially from the shafts and positioned in close proximity to opposing sides of the shaping rail, said conveyor rolls having uniform diameter with progressively diminishing cross section from the end portions to provide a generally concave supporting surface complementary to the curvature of the glass sheet after bending thereof to receive the glass sheet after it is bent and to retain the curvature in the bent glass sheet as it is transferred along the path to the cooling end of said frame, the shaping rail positioned below supporting surface of said conveyor rolls when the shaping rail is in the lowered position to facilitate movement of the glass sheet along the path, and positioned above said conveyor rolls when the shaping rail is in the raised position to shape the sheets of glass between the lower and upper press members.

2. The press bending apparatus defined in claim 1, including a second drive means mounted on said frame for selectively lowering and raising the upper press member.

3. The press bending apparatus defined in claim 1, wherein said conveyor includes a plurality of contoured preform rolls mounted at the heating end of said frame for preforming the sheets of glass prior to entering the bending area.

4. The press bending apparatus defined in claim 3, wherein said conveyor includes a conveyor drive connected to the horizontal shafts and the preforms rolls to simultaneously convey sheets of glass to and from the bending area.

5. The press bending apparatus defined in claim 4, wherein said conveyor drive includes a timing belt to drive a plurality of horizontal shafts.

6. The press bending apparatus defined in claim 1, including a second bending mold mounted on said frame and s second plurality of conveyor rolls disposed within the marginal outline of a shaping rail in said second bending mold for simultaneous bending of two sheets of glass.

7. The press bending apparatus defined in claim 6, wherein said second bending mold and the first bending mold are positioned in spaced-apart relationship to each other on said frame and aligned in transverse relationship to the path of the glass, wherein a conveyor roll from the first plurality of conveyor rolls and a conveyor roll from the second plurality of conveyor rolls are mounted on a horizontal shaft for parallel processing of the two sheets of glass.

8. The press bending apparatus defined in claim 1, wherein the conveyor rolls are provided with a hollow center.

9. The press bending apparatus defined in claim 1, wherein the conveyor rolls are covered with a soft, heat resistant material for engaging the sheets of glass.

10. The press bending apparatus defined in claim 1, including a positioning stop mounted on said conveyor, said positioning stop having a drive means to raise and lower the positioning stop for positioning the sheets of glass in the bending area.

11. The press bending apparatus defined in claim 10, including a controller to control and sequence the operation of said conveyor, said positioning stop, and the drive means for said bending mold.

12. Press bending apparatus for bending heat-softened glass sheets and mounted in aligned sequence between a furnace for heating sheets of glass and a cooling section for tempering or annealing bent sheets of glass, said press bending apparatus comprising:

a mobile frame, including means for moving said frame transversely into and out of operative position in the aligned sequence, said mobile frame including an upper platen and a lower platen mounted for reciprocating movement within said frame;

a bending mold for bending sheets of glass, said bending mold including opposed lower and upper horizontally disposed press members having complemental shaping surfaces for bending a sheet of glass, the lower press member having a peripheral shaping rail conforming to a marginal outline of the sheet of glass;

a lower base secured to the lower press member for temporarily mounting the lower press member on the lower platen in said frame, and an upper base secured to the upper press member for temporarily mounting the upper press member to the upper platen in said frame;

drive means mounted on said frame for selectively raising and lowering the lower platen and lower press member to position the lower press member in a recessed position for receiving a first sheet of glass, in a raised position for shaping the first sheet of glass between the lower and upper press members, and the recessed position for transferring the first sheet of glass after it is bent and receiving a second sheet of glass;

a conveyor positioned about the lower press member of said bending mold and independently mounted on said frame, said conveyor moving the sheets of glass along a predetermined horizontal path from a heating end of said frame through a bending area between the lower and upper press members to a cooling end of said frame, said conveyor including, in the bending area, a plurality of rotatably mounted, parallel, straight shafts extending transversely across the path;

a plurality of conveyor rolls, each conveyor roll being longitudinally secured on one of the straight shafts such that the conveyor rolls are disposed within the marginal outline of said shaping rail;

an upper lifting means formed on said upper base for selectively installing and removing the upper press member from said frame when said frame is moved to an out of line position and the upper base is disconnected from the upper platen in said frame; and a lower lifting means formed on said lower base, a complementary lifting means formed on said conveyor, and an interlocking means formed between said lower base and said conveyor for selectively and simultaneously installing and removing the lower press member and said conveyor from said frame when said frame is moved to an out of line position.

13. The press bending apparatus defined in claim 12, wherein the lower lifting means formed on said lower base includes a plate mounted on said lower base in parallel spaced-apart relationship to define a lifting aperture for receiving a lifting device.

14. The press bending apparatus defined in claim 12, wherein the complementary lifting means formed on said conveyor includes a first cross bar positioned transversely to the path of the glass sheets at the heating end of said frame and a second cross bar positioned transversely to the path of the glass sheets at the cooling end of said frame.

15. The press bending apparatus defined in claim 12, wherein the interlocking means includes a pair of parallel walls extending perpendicular to said lower base on opposite sides of said lower press member, said walls aligned perpendicular to the horizontal shafts of said conveyor and having a slot formed in an upper edge of said walls for receiving the horizontal shafts of said conveyor.

16. The press bending apparatus defined in claim 12, wherein said conveyor includes a pair of roll beams mounted on the frame and a pair of mounting rails temporarily connected to said roll beams, said mounting rails each supporting an end of the horizontal shafts of said conveyor.

17. Press bending apparatus for bending heat-softened glass sheets and mounted in aligned sequence between a furnace for heating sheets of glass and a cooling section for tempering or annealing bent sheets of glass, said press bending apparatus comprising:

a mobile frame, including means for moving said frame transversely into and out of operative position in the aligned sequence, said mobile frame including an upper platen and a lower platen mounted for reciprocating movement within said frame;

a bending mold mounted on said frame for bending sheets of glass, said bending mold including opposed lower and upper horizontally disposed press members having complemental shaping surfaces, the lower press member having a continuous peripheral shaping rail conforming to a marginal outline of the sheet of glass;

a lower base secured to the lower press member for temporarily mounting the lower press member on the lower platen in said frame, and an upper base secured to the upper press member for temporarily mounting the upper press member to the upper platen in said frame;

drive means mounted on said frame for selectively raising and lowering the lower platen and lower press member to position the shaping rail in a recessed position for receiving a first sheet of glass, in a raised position for shaping the first sheet of glass between the lower and upper press members, and the recessed position for transferring the first sheet of glass after it is bent and receiving a second sheet of glass;

a conveyor positioned about the lower press member of said bending mold and independently mounted on said frame, said conveyor moving the sheets of glass along a predetermined horizontal path from a heating end of said frame through a bending area between the lower and upper press members to a cooling end of said frame, said conveyor including, in the bending area, a plurality of rotatably mounted, parallel, straight shafts extending transversely across the path below the shaping rail of the lower press member;

a plurality of conveyor rolls, each conveyor roll being longitudinally secured on one of the straight shafts such that the conveyor rolls are disposed within the marginal outline of said shaping rail, said conveyor rolls having opposing end portions extending radially from the shafts and positioned in close proximity to opposing sides of the shaping rail, said conveyor rolls having uniform diameter with progressively diminishing cross section from the end portions to provide a generally concave supporting surface complementary to the curvature of the glass sheet after bending thereof to receive the glass sheet after it is bent and to retain the curvature in the bent glass sheet as it is transferred along the path to the cooling end of said frame, the shaping rail positioned below supporting surface of said conveyor rolls when the shaping rail is in the recessed position to facilitate movement of the glass sheet along the path, and positioned above said conveyor rolls when the shaping rail is in the raised position to shape the sheets of glass between the lower and upper press members;

an upper lifting means formed on said upper base for selectively installing and removing the upper press member from said frame when said frame is moved to an out of line position and the upper base is disconnected from the upper platen in said frame; and a lower lifting means formed on said lower base, a complementary lifting means formed on said conveyor, and an interlocking means formed between said lower base and said conveyor for selectively and simultaneously installing and removing the lower press member and said conveyor from said frame when said frame is moved to an out of line position.

* * * * *